US012739279B2

(12) United States Patent
Bennatan et al.

(10) Patent No.: US 12,739,279 B2
(45) **Date of Patent: *Sep. 15, 2026**

(54) TECHNIQUES FOR DIGITAL WALLET INTEGRATION AND FOR SCANNING TRANSACTIONS USING INTEGRATED MODULES

(71) Applicant: Blockaid LTD, Tel Aviv (IL)

(72) Inventors: Ido Bennatan, Tel Aviv (IL); Raz Abraham Eliahou Niv, Savyon (IL)

(73) Assignee: Blockaid LTD, Tel Aviv (IL)

( * ) Notice: Subject to any disclaimer, the term of this patent is extended or adjusted under 35 U.S.C. 154(b) by 171 days.

This patent is subject to a terminal disclaimer.

(21) Appl. No.: 18/435,720

(22) Filed: Feb. 7, 2024

(65) Prior Publication Data

US 2024/0291862 A1 Aug. 29, 2024

Related U.S. Application Data

(63) Continuation of application No. 18/463,750, filed on Sep. 8, 2023, now Pat. No. 11,930,043.

(Continued)

(51) Int. Cl.

| | |
|---|---|
| ***H04L 9/40*** | (2022.01) |
| ***G06F 9/54*** | (2006.01) |
| ***G06Q 20/36*** | (2012.01) |

(52) U.S. Cl.

CPC .......... *H04L 63/1483* (2013.01); *G06F 9/547* (2013.01); *G06Q 20/36* (2013.01)

(58) Field of Classification Search

None

See application file for complete search history.

(56) References Cited

U.S. PATENT DOCUMENTS

| | | | | |
|---|---|---|---|---|
| 8,370,264 | B1 | 2/2013 | Wei et al. | |
| 9,071,600 | B2 * | 6/2015 | Alagha | H04L 63/0853 |

(Continued)

FOREIGN PATENT DOCUMENTS

| | | | |
|---|---|---|---|
| CN | 110572398 | A | 12/2019 |
| CN | 110602138 | A | 12/2019 |

(Continued)

OTHER PUBLICATIONS

Li, Kai, et al. "As Strong As Its Weakest Link: How to Break Blockchain DApps at RPC Service." NDSS. 2021. (Year 2021).

(Continued)

*Primary Examiner* — Khang Do

(74) *Attorney, Agent, or Firm* — M&B IP Analysts, LLC

(57) ABSTRACT

A system and method for digital wallet integration. A website is determined to be malicious. Furthermore, a module is implemented with a digital wallet such that the module is adapted to intercept calls to the digital wallet. The module may have limited communication capabilities that prevent leaking of data from the wallet with which the module is integrated while allowing for testing websites with which the module communicates. For example, the module may be configured to transmit only transactions and simulated RPC responses, and not to transmit any other data of the wallet or of a device associated with a user of the wallet. In some implementations, the module may be realized as a binary large object (blob) which is unilaterally pushed to a system on which the module will be deployed.

21 Claims, 7 Drawing Sheets

Related U.S. Application Data

(60) Provisional application No. 63/487,310, filed on Feb. 28, 2023.

(56) References Cited

U.S. PATENT DOCUMENTS

| | | | | |
|---|---|---|---|---|
| 10,277,631 | B1 | 4/2019 | Gemeniano | |
| 10,873,457 | B1 | 12/2020 | Beaudoin et al. | |
| 10,901,957 | B2 | 1/2021 | Natarajan et al. | |
| 10,972,279 | B2 | 4/2021 | Sethi et al. | |
| 11,277,390 | B2 * | 3/2022 | Verzun | G06F 21/64 |
| 11,394,741 | B1 * | 7/2022 | Ortiz | G06F 21/6245 |
| 11,734,533 | B1 * | 8/2023 | Cohen | H04L 9/3213 235/462.1 |
| 11,797,697 | B1 | 10/2023 | Holmes et al. | |
| 11,930,043 | B1 * | 3/2024 | Bennatan | H04L 63/1483 |
| 12,045,826 | B1 * | 7/2024 | Bennatan | H04L 9/3239 |
| 12,423,687 | B1 * | 9/2025 | Walbroehl | G06F 21/64 |
| 2002/0083336 | A1 | 6/2002 | Bradford et al. | |
| 2003/0233581 | A1 | 12/2003 | Reshef et al. | |
| 2006/0031928 | A1 * | 2/2006 | Conley | H04L 63/029 726/11 |
| 2010/0287613 | A1 * | 11/2010 | Singh | H04L 63/166 726/22 |
| 2011/0055013 | A1 * | 3/2011 | Hammad | G06Q 10/109 709/204 |
| 2011/0321139 | A1 | 12/2011 | Jayaraman et al. | |
| 2012/0297204 | A1 | 11/2012 | Buer | |
| 2013/0098984 | A1 | 4/2013 | Shenker et al. | |
| 2014/0033188 | A1 * | 1/2014 | Beavers | G06F 8/65 717/170 |
| 2014/0058937 | A1 | 2/2014 | Watson | |
| 2014/0165177 | A1 | 6/2014 | Alagha et al. | |
| 2015/0023572 | A1 | 1/2015 | Williform | |
| 2015/0199254 | A1 | 7/2015 | Vesepogu et al. | |
| 2015/0269380 | A1 * | 9/2015 | Golovanov | H04L 63/1475 726/24 |
| 2016/0005029 | A1 | 1/2016 | Ivey et al. | |
| 2016/0188630 | A1 | 6/2016 | Pfeifle et al. | |
| 2016/0232353 | A1 | 8/2016 | Gupta et al. | |
| 2016/0335657 | A1 * | 11/2016 | Griffin | G06Q 30/0231 |
| 2017/0048272 | A1 | 2/2017 | Yamamura et al. | |
| 2017/0346851 | A1 | 11/2017 | Drake | |
| 2018/0063667 | A1 * | 3/2018 | Nitsch | H04W 12/04 |
| 2018/0068097 | A1 * | 3/2018 | Collin | H04L 63/0892 |
| 2018/0240107 | A1 | 8/2018 | Andrade | |
| 2018/0322286 | A1 | 11/2018 | Diehl et al. | |
| 2018/0365674 | A1 * | 12/2018 | Han | G06Q 30/06 |
| 2019/0073666 | A1 | 3/2019 | Ortiz et al. | |
| 2019/0273739 | A1 * | 9/2019 | Pemmaraju | H04L 63/145 |
| 2019/0340685 | A1 | 11/2019 | Wade et al. | |
| 2019/0386969 | A1 | 12/2019 | Verzun et al. | |
| 2020/0120107 | A1 | 4/2020 | Mcgrew et al. | |
| 2020/0142809 | A1 * | 5/2020 | Adibowo | G06F 8/71 |
| 2020/0294006 | A1 | 9/2020 | Hadi | |
| 2020/0311790 | A1 * | 10/2020 | Keren | G06Q 20/4016 |
| 2020/0313856 | A1 * | 10/2020 | Basu | H04L 9/3073 |
| 2020/0374133 | A1 | 11/2020 | Liu et al. | |
| 2021/0027325 | A1 * | 1/2021 | Lore | G06Q 30/0215 |
| 2021/0097528 | A1 | 4/2021 | Wang | |
| 2021/0160281 | A1 * | 5/2021 | Hallaji | H04L 63/1491 |
| 2021/0233200 | A1 | 7/2021 | Meltzer et al. | |
| 2021/0233351 | A1 | 7/2021 | Meltzer et al. | |
| 2021/0304311 | A1 * | 9/2021 | Banescu | G06Q 40/06 |
| 2021/0314139 | A1 | 10/2021 | Zhang et al. | |
| 2022/0131877 | A1 * | 4/2022 | Oest | G06F 21/566 |
| 2022/0224532 | A1 | 7/2022 | Bezzateev et al. | |
| 2022/0237595 | A1 | 7/2022 | Roach et al. | |
| 2022/0318122 | A1 | 10/2022 | Hughes et al. | |
| 2022/0337607 | A1 * | 10/2022 | Manevich | G06N 20/00 |
| 2023/0006976 | A1 * | 1/2023 | Jakobsson | H04L 63/10 |
| 2023/0230091 | A1 | 7/2023 | Vaughn | |
| 2023/0298002 | A1 | 9/2023 | Moiyallah, Jr. et al. | |
| 2023/0328098 | A1 * | 10/2023 | Illum | H04L 67/1097 709/224 |
| 2023/0360034 | A1 * | 11/2023 | DeLuca | G06Q 20/065 |
| 2023/0376941 | A1 | 11/2023 | Jin et al. | |
| 2023/0396446 | A1 | 12/2023 | Sekar et al. | |
| 2023/0410105 | A1 | 12/2023 | Gazman | |
| 2023/0421377 | A1 * | 12/2023 | Jakobsson | H04L 9/50 |
| 2024/0078540 | A1 | 3/2024 | Mayadas et al. | |
| 2024/0114038 | A1 * | 4/2024 | Balazs | H04L 63/1408 |
| 2024/0152883 | A1 * | 5/2024 | Rezaiean-Asel | G06Q 20/0655 |
| 2024/0250971 | A1 * | 7/2024 | Rapowitz | G06Q 50/01 |
| 2024/0291862 | A1 * | 8/2024 | Bennatan | G06Q 20/4016 |
| 2024/0338705 | A1 * | 10/2024 | Bennatan | G06F 9/542 |
| 2024/0356770 | A1 * | 10/2024 | Kwon | H04L 69/04 |
| 2025/0080572 | A1 * | 3/2025 | Sanchez Rola | H04L 63/1425 |

FOREIGN PATENT DOCUMENTS

| | | | | |
|---|---|---|---|---|
| CN | 111047319 | A | | 4/2020 |
| CN | 115378713 | | * | 11/2022 |
| CN | 115378713 | A | | 11/2022 |
| WO | 2021114445 | A1 | | 6/2021 |

OTHER PUBLICATIONS

Lu, Hui, et al. "AutoD: Intelligent blockchain application unpacking based on JNI layer deception call." IEEE Network 35.2 (2020): 215-221. (Year: 2020).

NPL Search Terms (Year: 2024).

Su, Liya, et al. "Evil under the sun: Understanding and discovering attacks on ethereum decentralized applications." 30th USENIX Security Symposium (USENIX Security 21). 2021 (Year: 2021).

International Search Report for PCT/IB2024/051395, dated Apr. 30, 2024. Searching Authority Israel Patent Office, Jerusalem, Israel.

International Search Report for PCT/IB2024/051398, dated Apr. 30, 2024. Searching Authority, Israel Patent Office, Jerusalem, Israel.

Written Opinion of the Searching Authority for PCT/IB2024/051395, dated Apr. 30, 2024. Searching Authority Israel Patent Office, Jerusalem, Israel.

Written Opinion of the Searching Authority for PCT/IB2024/051398, dated Apr. 30, 2024. Searching Authority, Israel Patent Office, Jerusalem, Israel.

U.S. Appl. No. 18/463,716, filed Sep. 8, 2023, Ido Bennatan.

NPL Search Terms (Year: 2025).

Extended European Search Report for EP application No. 24763324.1, dated Jun. 24, 2026. European Patent Office, Munich, Germany.

Hassan, Md Arif, Zarina Shukur, and Masnizah Mohd. "A penetration testing on Malaysia popular e-wallets and m-banking apps." International Journal of Advanced Computer Science and Applications 13.5 (2022). (Year: 2022).

NPL Search Terms (Year: 2026).

Sami, Ashkan, et al. "Malware detection based on mining API calls." Proceedings of the 2010 ACM symposium on applied computing. 2010 (Year: 2010).

Extended European Search Report for EP application No. 24763325.8, dated Jul. 9, 2026. European Patent Office, Munich, Germany IYA SU1 et al: "Evil Under the Sun: Understanding and Discovering Attacks on Ethereum Decentralized Applications", Usenix Usenix, the Advanced Computing Systems Association, Sep. 13, 2021 (Sep. 13, 2021), pp. 1332-1349, XP061067997, [retrieved on Sep. 13, 2021].

Zhou Jianfei et al: "DAppHunter: Identifying Inconsistent Behaviors of Blockchain-based Decentralized Applications", 2023 IEEE/ACM 45th International Conference on Software Engineering: Software Engineering In Practice (ICSE-SEIP) IEEE, May 14, 2023 (May 14, 2023), pp. 24-35, XP034375987, DOI: 10.1109/ICSE-SEIP58684.2023.00008 [retrieved on Jul. 12, 2023].

* cited by examiner

TECHNIQUES FOR DIGITAL WALLET INTEGRATION AND FOR SCANNING TRANSACTIONS USING INTEGRATED MODULES

CROSS-REFERENCE TO RELATED APPLICATIONS

This application is a continuation of U.S. Non-Provisional application Ser. No. 18/463,750 filed on Sep. 8, 2023, which claims the benefit of U.S. Provisional Application No. 63/487,310 filed on Feb. 28, 2023.

The contents of the above-referenced applications are hereby incorporated by reference.

TECHNICAL FIELD

The present disclosure relates generally to digital wallets such as wallets used for accessing blockchains, and more specifically to integrating with digital wallets to perform tests via the digital wallet.

BACKGROUND

Uses of blockchain technology have been on the rise in recent years. One particular development that came about due to the advent of blockchains is the use of blockchain as one of the building blocks for the next generation of the Internet, commonly referred to as web 3.0. More specifically, blockchains are decentralized electronic ledgers built upon a network of peer-to-peer nodes. Each peer node in a blockchain network stores a copy of the blockchain such that the blockchain is not stored in only a single centralized storage. The decentralized nature of the blockchain, in combination with procedures used for validating and recording transactions, ensures that the ledger cannot be unilaterally edited by a single node. This provides reliability of the data stored on the blockchain.

The blueprint for blockchain design has been adopted as part of the plan for web 3.0. In particular, blockchain has provided a new design for a decentralized data storage which can be adapted for decentralized web design. As part of this decentralized web design, the concept of a decentralized application (dApp) has been conceived. dApps are computer software programs which are executed over blockchain networks rather than on conventional centralized servers. Unlike previously developed computer programs, dApps are not necessarily managed or controlled by a single central authority. Instead, they are decentralized and can be collectively managed by many nodes which are owned or operated by different entities. The blockchain protocols provide an agreed upon set of rules for these entities with respect to the blockchain that does not require any single trusted entity in order to be implemented.

Existing dApp plans generally include a frontend and a backend, where the frontend is a portion of code executed on the user side (e.g., on a user device interacting with the blockchain network) and the backend is a portion of code is a portion of code executed on the nodes of the blockchain network. The backend may be realized as one or more smart contracts running on the nodes. The user of smart contracts distributed among multiple decentralized nodes makes the dApp decentralized as contrasted with running the backend code on a single central server or a set of centralized servers.

In blockchain implementations, the portion of code on the user side is typically realized via a digital wallet. A digital wallet, also referred to as a wallet, is a computer program or device configured to access one or more decentralized networks and, in particular, to access one or more distributed electronic ledgers such as blockchains. The wallet may store data such as, but not limited to, data used to access distributed electronic ledger (e.g., access credentials), data indicating assets of an account associated with the wallet whose ownership is recorded on one or more distributed electronic ledgers (e.g., values indicating amounts of cryptocurrency or data of digital assets such as non-fungible tokens), both, and the like. A wallet may be a personal wallet that is uniquely associated with a particular user and hold that user's personal assets, or may be an organizational wallet owned by a company or other organization which may hold assets to be used for conducting that organization's activities.

Because digital wallets stores data that provides the wallet user with the ability to access assets held by the wallet, it is critical to ensure that unauthorized access is not inadvertently granted to the wallet. Malicious access to wallets may cause problems such as, but not limited to, theft of currency (e.g., of cryptocurrency), of property (e.g., of digital assets such as non-fungible tokens or otherwise of assets whose ownership is represented on the blockchain), identity theft (e.g., for blockchain implementations where users are not anonymous such that possessing the user's wallet can serve as a form of identification), alteration of agreements (e.g., agreements reflected in smart contracts stored on blockchains), and much more.

Solutions which enable new ways of securing digital wallets against potential cyber threats are therefore highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for digital wallet integration. The method comprises: determining that a website is malicious; and deploying a module having data indicating the malicious website with respect to a digital wallet such that the module is adapted to intercept requests to the digital wallet, wherein the module is configured to generate transactions, wherein at least a portion of the requests to the digital wallet are returned in response to the transactions generated by the module, wherein the module is further configured to return a simulation of transferred assets indicated in a transaction associated with at least a portion of the requests.

Certain embodiments disclosed herein also include a non-transitory computer readable medium having stored thereon causing a processing circuitry to execute a process, the process comprising: determining that a website is malicious; and deploying a module having data indicating the malicious website with respect to a digital wallet such that the module is adapted to intercept requests to the digital wallet, wherein the module is configured to generate transactions, wherein at least a portion of the requests to the digital wallet are returned in response to the transactions generated by the module, wherein the module is further configured to return a simulation of transferred assets indicated in a transaction associated with at least a portion of the requests.

Certain embodiments disclosed herein also include a system for digital wallet integration. The system comprises: a processing circuitry; and a memory, the memory containing instructions that, when executed by the processing circuitry, configure the system to: extract a plurality of calls made by a website; analyze the plurality of calls in order to identify anomalous behavior by the website; determine that the website is malicious based on the identified anomalous behavior; and deploy a module with respect to a digital wallet such that the module is adapted to intercept requests to the digital wallet, wherein the module is configured to generate transactions, wherein at least a portion of the requests to the digital wallet are returned in response to the transactions generated by the module, wherein the module has data indicating the website which is determined to be malicious.

Certain embodiments disclosed herein include the method, non-transitory computer readable medium, or system noted above or below, wherein the transactions generated by the module are a plurality of second transactions, further including or being configured to perform the following steps: generating a plurality of first transactions based on the digital wallet, wherein the plurality of calls is extracted from a plurality of responses to the plurality of first transactions.

Certain embodiments disclosed herein include the method, non-transitory computer readable medium, or system noted above or below, wherein the plurality of first transactions is generated based on a plurality of sample transactions for the digital wallet.

Certain embodiments disclosed herein include the method, non-transitory computer readable medium, or system noted above or below, further including or being configured to perform the following steps: performing at least one mitigation action with respect to the website which is determined to be malicious.

Certain embodiments disclosed herein include the method, non-transitory computer readable medium, or system noted above or below, wherein the module is configured to transmit only transactions and simulated responses.

Certain embodiments disclosed herein include the method, non-transitory computer readable medium, or system noted above or below, wherein the module is a binary large object, further including or being configured to perform the following steps: pushing the binary large object to the digital wallet.

Certain embodiments disclosed herein include the method, non-transitory computer readable medium, or system noted above or below, wherein the binary large object pushed to the digital wallet is a first version of the binary large object, further including or being configured to perform the following steps: pushing a second version of the binary large object to the digital wallet, wherein the second version of the binary large object includes differential data indicating differences as compared to the first version of the binary large object.

Certain embodiments disclosed herein include the method, non-transitory computer readable medium, or system noted above or below, further including or being configured to perform the following steps: transmitting the module via unidirectional transmission.

Certain embodiments disclosed herein include the method, non-transitory computer readable medium, or system noted above or below, wherein the deployed module includes: a security validation engine, wherein the security validation engine is configured with at least one validation function designed to receive a remote procedure call (RPC) method and to return a result indicating whether the received RPC method is malicious; a simulation engine, wherein the simulation engine is configured with a simulate transaction function; and a RPC node provider, wherein the RPC node provider is configured to send RPCs to a plurality of RPC nodes and to receive transaction data from the plurality of RPC nodes.

Certain embodiments disclosed herein include the method, non-transitory computer readable medium, or system noted above or below, wherein the module is deployed on a first system, wherein the deployed module is configured to preserve privacy of at least an owner of the first system by sending data only including the RPCs to external second systems, wherein the external second systems are external to the first system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
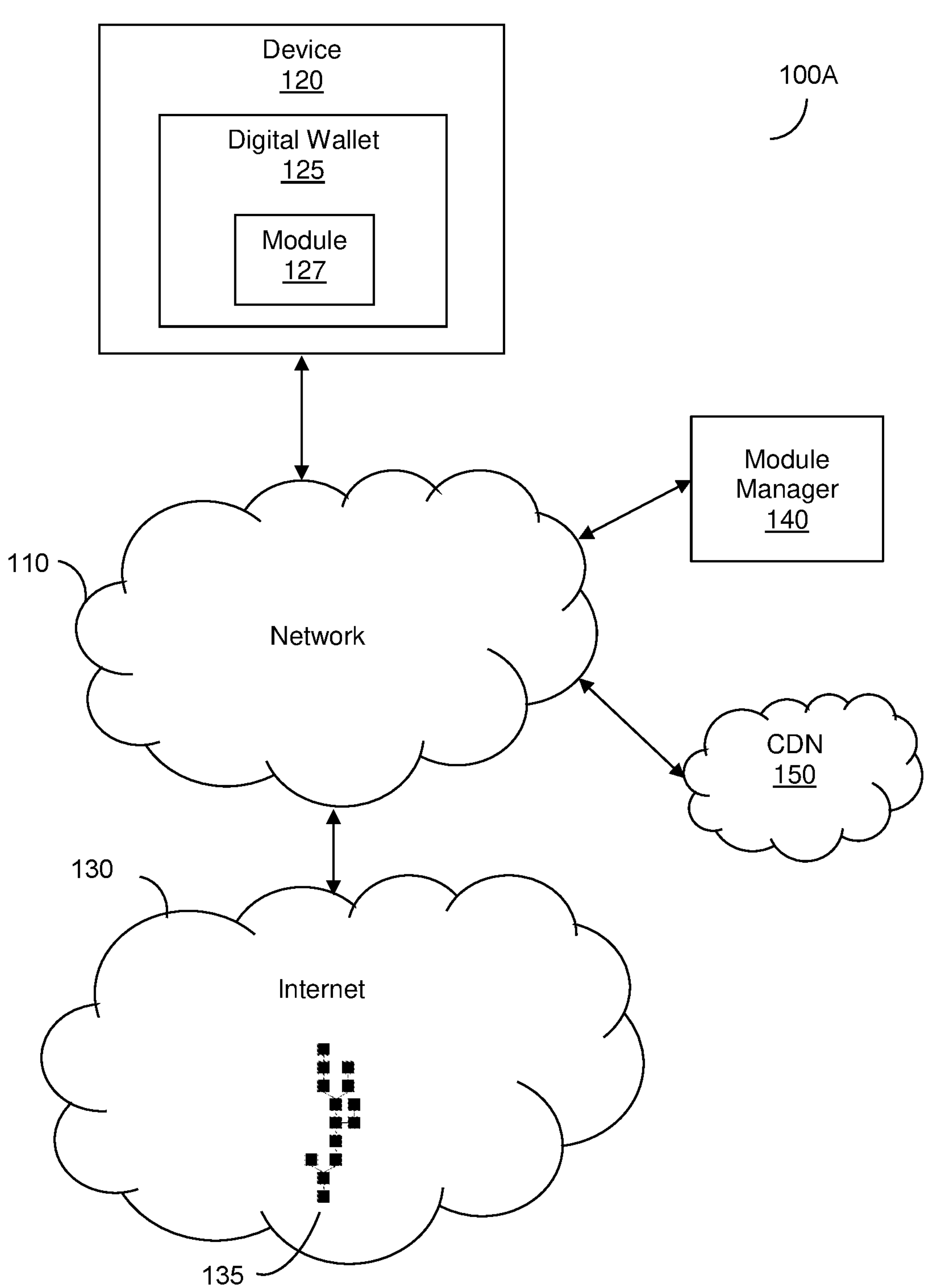
FIGS. 1A-B are network diagrams utilized to describe various disclosed embodiments.

The disclosed embodiments include techniques for integrating modules in wallets which may be utilized, for example, to facilitate data collection (e.g., collecting data related to wallet calls). Moreover, the data may be collected internally within the integrated module and without exposing the data to external systems or while otherwise minimizing exposure of the data to external systems.

The disclosed embodiments further include techniques for testing which leverage the wallet integration in order to collect data that may be utilized for purposes such as determining whether calls made to a wallet interacts are malicious. In particular, the disclosed embodiments may be utilized to test wallet calls from a website intercepted by the module by analyzing those calls to determine if the website is malicious. The disclosed embodiments therefore also provide data which may be leveraged to secure digital wallets and devices from cyber attackers attempting to utilize malicious wallet calls in order to exploit vulnerabilities in those wallets and devices.

To this end, in an embodiment, the module is integrated with a wallet as described herein so as to intercept requests such as wallet calls to the wallet, thereby ensuring that requests from the website are not allowed to reach the wallet, at least until those requests are scanned for potentially malicious behavior. In a further embodiment, the module has limited communication capabilities that prevent leaking of data from the wallet with which the module is integrated while allowing for testing websites with which the module communicates. For example, the module may be configured to transmit only transactions and simulated RPC responses, and not to transmit any other data of the wallet or of a device associated with a user of the wallet.

In accordance with various embodiments, the module may be realized as a binary large object (blob) pushed to the device or system on which the module is deployed, for example via a content delivery network. Updated blobs including updated blob data and/or functions may be pushed to the device or system periodically, thereby allowing for updating the data used for testing, for example as new websites are discovered by a system managing the modules.

The wallet integration in accordance with the various disclosed embodiments may be performed in order to implement a module in a manner that allows for activities such as intercepting wallet calls while preserving privacy of the owner of the device on which the module is deployed and while allowing the module to operate offline with respect to an external website monitoring service. The disclosed embodiments may therefore be implemented locally on a user's device and without requiring that the device communicate with a server operated by an entity providing the wallet integration and testing services. Such embodiments therefore provide additional potential cybersecurity benefits as well as the ability to reduce network communications and the accompanying use of computing resources needed for such network communications.

More specifically, the disclosed embodiments allow for performing testing requiring generating transactions as well as responses to requests from websites without unnecessarily exposing data such as, but not limited to, an Internet protocol address of the wallet or of a device on which the wallet is installed, a cryptocurrency address of an owner of the wallet, pre-signed transactions, and the like.

The various disclosed embodiments also include techniques for identifying potentially malicious websites implemented as decentralized applications (dApps), where the results of such identification may be used to improve the modules integrated as described herein.

In this regard, it has been identified that some attackers who seek to exploit decentralized applications attempt to determine the identity of users in order to determine how those users might be exploited. To this end, such attackers may attempt to intercept wallet calls as part of the attempt to identify users. Websites may engage in malicious behavior in different ways, but many malicious web 3.0 websites realized as dApps involve exploiting wallet calls. Accordingly, it has been further identified that potentially malicious behavior of dApps can be detected by analyzing wallet calls. The disclosed embodiments provide techniques for integrating modules to intercept wallet calls and for analyzing such wallet calls in order to detect potentially malicious dApps over the Internet.

It is also noted that one of the major benefits of blockchain-based solutions is the ability to maintain user anonymity while ensuring trust for transactions between individuals who would otherwise not trust each other. However, cybersecurity solutions that scan a particular device or wallet may ultimately defeat this privacy benefit. To this end, the disclosed embodiments further provide techniques and solutions which integrate a limited-capability module with a wallet in order to generate transactions without any unauthorized exposure of data from the wallet, thereby preserving privacy. Further, some disclosed embodiments include techniques for creating such a module and for managing data of the module by periodically pushing binary large objects (blobs) to the module (e.g., by a content delivery network) or pulling blobs by the module (e.g., from a content delivery network) in order to allow for the module to be updated with new website data without requiring sending communications to any backend system, thereby further ensuring privacy and improving cybersecurity by minimizing potential sources of data leakage.

Figure 1B:
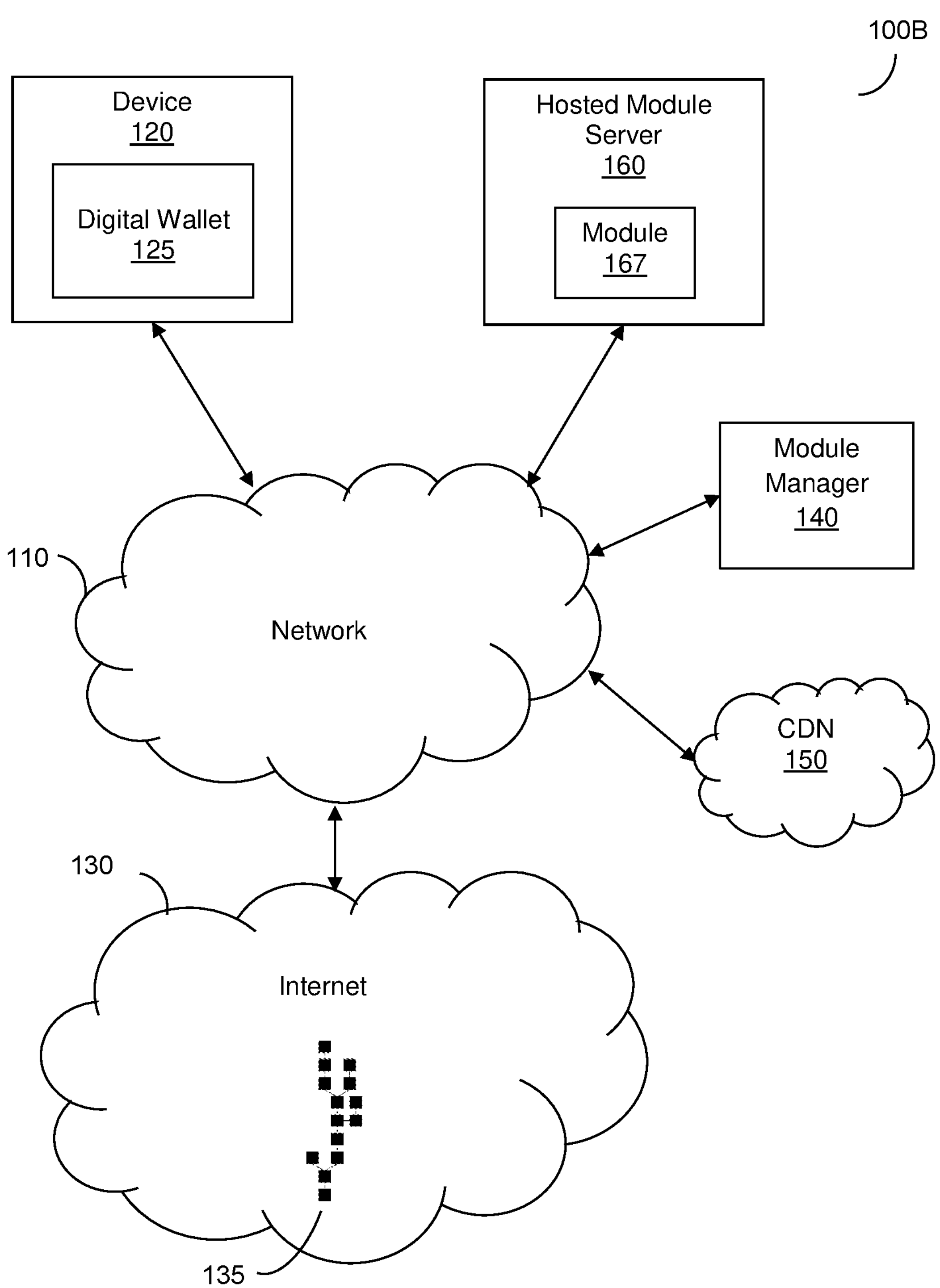

FIGS. 1A-B shows example network diagrams 100A and 100B utilized to describe the various disclosed embodiments. In the example network diagram 100A, a device 120, the Internet 130, a module manager 140, and a content delivery network (CDN) 150 communicate via one or more networks 110.

The networks 110 may be, but are not limited to, any of or a portion of a wireless, cellular or wired network, a local area network (LAN), a wide area network (WAN), a metro area network (MAN), the Internet, the worldwide web (WWW), similar networks, and any combination thereof.

The device 120 may be, but is not limited to, a personal computer, a laptop, a tablet computer, a smartphone, a wearable computing device, a server, or any other device capable of accessing websites running as decentralized applications (dApps) pursuant to the Web 3.0 model.

To this end, the device 120 is equipped with (as shown) or is communicatively connected to (not shown) a digital wallet 125. A digital wallet, also referred to as a wallet, is a computer program or device utilized to access assets held by a user via a decentralized ledger such as a blockchain. The digital wallet 125 is configured to access one or more decentralized networks (not shown) and, in particular, to access a distributed electronic ledger such as the distributed electronic ledger 135 of the Internet 130. The digital wallet 125 may store data such as, but not limited to, data used to access distributed electronic ledgers (e.g., access credentials), data indicating assets of an account associated with the digital wallet 125 whose ownership is recorded on one or more distributed electronic ledgers (e.g., values indicating amounts of cryptocurrency or data of digital assets such as non-fungible tokens), both, and the like.

In accordance with various disclosed embodiments, the device 120 further has a module 127 installed thereon. The module 127 is configured to perform at least a portion of the disclosed embodiments related to transaction analysis and perform transaction security activities. To this end, the module 127 may be installed as an extension on the digital wallet 125 or otherwise implemented in the digital wallet 125.

In an example implementation, the module 127 may be realized at least partially as a binary large object (blob). Such a blob is a collection of binary data stored as a single entity, for example in a database management system. In such embodiments, each blob may include a collection of data on existing websites (e.g., website data created or collected by the module manager 140), instructions for performing functions of the module (e.g., instructions which realize the logical components of the logical diagram 200 and which enable collection of data related to wallet calls as discussed herein), or both.

In some implementations, the device 120 may be a user device owned or operated by a person who may access web 3.0 websites. In such implementations, the digital wallet 125 may be a personal digital wallet of the user and may include the user's personal assets. Further, in such implementations, the module 127 may be realized as an agent installed on the device 120.

In another implementation, the device 120 may be a server or other system owned or operated by an entity who uses web 3.0 websites in order to realize or otherwise in order to provide their services. In such cases, the digital wallet 125 may be an organization digital wallet of the entity operating the device 120 and may include business assets or other assets which may be utilized for the organization's services (e.g., cryptocurrency utilized to purchase services consumed by the device 120).

The Internet 130 is an interconnected network which is at least partially designed according to the web 3.0 model in which websites are realized as decentralized applications (dApps) hosted across a plurality of nodes (not separately depicted in FIG. 1) of a decentralized network (e.g., the Internet 130 or a subset thereof). To this end, the Internet 130 is implemented via one or more distributed electronic ledgers 135. Each distributed electronic ledger 135 may be, but is not limited to, a blockchain or other ledger distributed across multiple nodes.

As noted above, such decentralized applications may need to be secured against potential cyber threats. In particular, it has been identified that attackers attempting to exploit vulnerabilities in dApps may attempt to identify users by intercepting wallet calls, so malicious websites may be implemented by attackers as dApps in order to gain access to wallet calls for their malicious purposes. The disclosed embodiments provide techniques for identifying dApps among websites available via the Internet 130 as well as for scanning the identified dApps in order to detect potentially malicious behavior.

The module manager 140 is configured to manage the module 127 as well as any other modules (not shown) utilizing existing website data. To this end, the module manager 140 may be a server or other system configured to push data (e.g., website data, computer instructions, both, etc.) to the device 120. In some implementations, the module manager 140 may be further configured to receive data about new websites from the device 120 or from other devices (not shown). Blobs to be deployed as the module 127 and integrated with the wallet 125 may be received by the module manager 140 using the results of previous scans performed by the module manager 140 acting as a web scanner or received from an external web scanner (not shown) such as, but not limited to, the existence of discovered websites, whether each website was determined to be malicious or not, both, and the like. Such results of previous scans may be utilized by the modules in order to determine if calls are being received from malicious dApps and therefore the wallet should be protected from those calls (e.g., by preventing those calls from being received by the wallet).

The module manager 140 may be configured to periodically, continuously, or otherwise repeatedly push new data to the device 120, for example data including newly discovered websites. To this end, in some embodiments, the module manager 140 may be configured to create new blobs and to push new blobs to the device 120, for example periodically. The new blobs or other data from the module manager 140 may be sent to the device 120 via one or more networks such as, but not limited to, a content delivery network (CDN) 150. As noted above, the module 127 may include at least two kinds of memory segments, i.e., kinds of data which are utilized to execute the module: code and data. Each memory segment may be updated through differential (diff) functions, thereby minimizing the network usage needed to deploy updated data on the device 120. Such diffs may include, but are not limited to, additions of data and code, and may further include subtractions of portions of data or code which are no longer to be used with the module 127. More specifically, for such a subtraction, previously identified threats (e.g., previously detected malicious websites) may be excluded from data pushed to the device 120, thereby removing old threats from the data to be transmitted.

FIG. 1B depicts a network diagram 100B according to another example implementation in which a module configured like the module 127 of FIG. 1A is deployed externally to the device 120. To this end, in FIG. 1B, a module 167 is deployed on a hosted module server 160. The module 167 may be configured with limited communication capabilities, may be integrated with the wallet 125, and may otherwise be implemented as discussed below in order to enable the module 167 to be utilized for testing as described herein while minimizing the exposure of any data of the device 120 or the wallet 125 to external systems (i.e., systems other than the device 120 or the hosted module system 160). Moreover, the communication capabilities of the module 167 may be limited such that even the operator of the hosted module server 160 cannot access data of the wallet 125 or otherwise of the device 120, thereby ensuring privacy.

It should be noted that FIGS. 1A-B depict the Internet merely for example purposes, but that the disclosed embodiments may be equally applied to other portions of the Internet or otherwise other networks on which dApps are hosted in at least a portion of the network in order to discover websites implemented on those networks, to determine whether those websites are dApps, and to scan any identified dApps for potentially malicious behavior.

Figure 2:
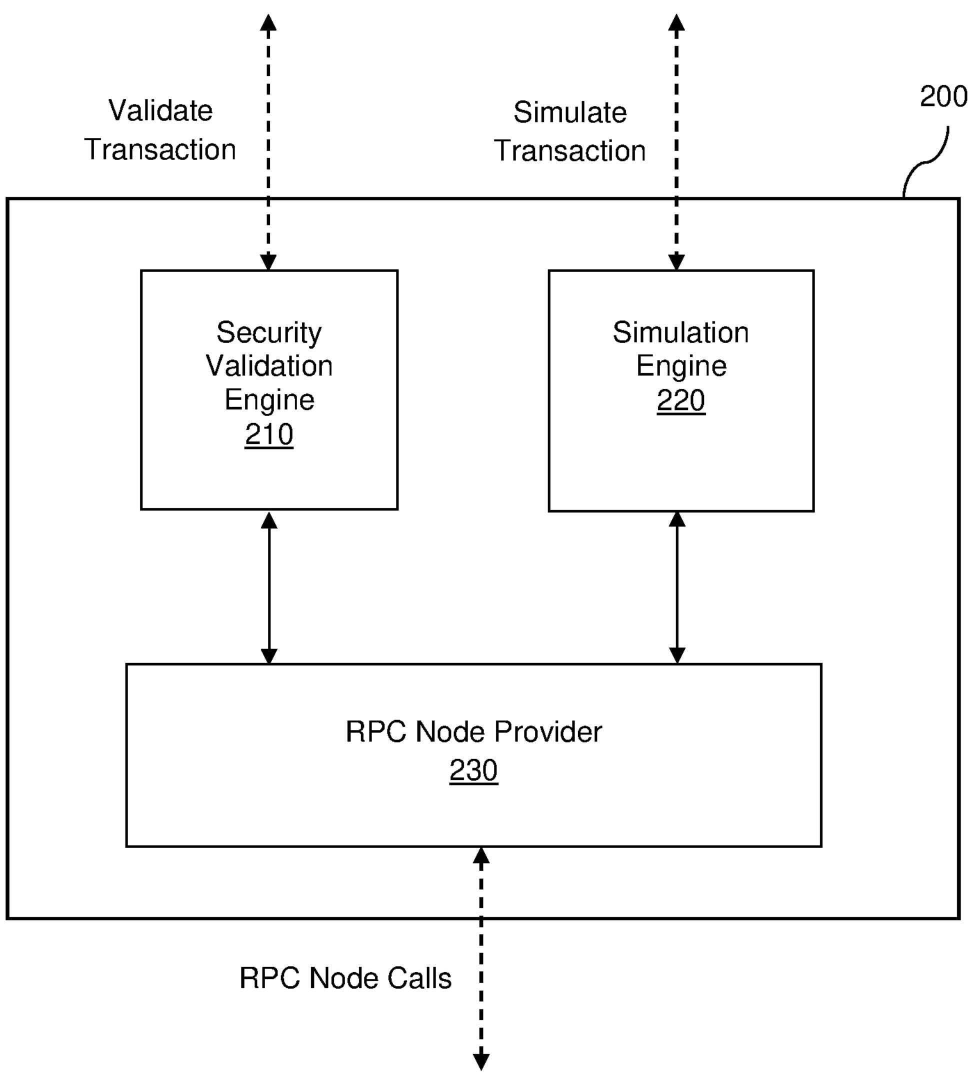
FIG. 2 is a logical diagram of a module according to an embodiment.

FIG. 2 is a logical diagram 200 of a module according to an embodiment. The logical diagram 200 may reflect interactions between logical components of a module such as, but not limited to, the module 127 of FIG. 1A or the module 167 of FIG. 1B. The logical components may be realized as, for example, sets of computer-executable instructions for performing discrete portions of at least some disclosed embodiments.

The logical diagram 200 illustrates a security validation engine 210, a simulation engine 220, and a remote procedure call (RPC) node provider 230. As depicted in FIG. 2, the module represented by the logical diagram 200 includes three points of entry wherein components of the logical diagram 200 communicate with an external environment. More specifically, the security validation engine 210 has a point of entry for sending and receiving data related to validating transactions, the simulation engine 220 has a point of entry for sending and receiving data related to simulating transactions, and the RPC node provider 230 has a point of entry for sending RPC node calls.

In an embodiment, the security validation engine 210 and the simulation engine 220 may each be configured with one or more exported functions defined elsewhere and pushed to a device on which the module is to be deployed. More specifically, such functions may be included in a binary large object (blob) generated by an external system and pushed to the device in order to deploy the module on the device. Additional blobs may be created and pushed to the device, for example periodically, in order to update the functions or otherwise to update the data of the module deployed on the device. Moreover, these exported functions can be designed to avoid sending any data other than their specifically defined returned data in order to prevent the exported functions from leaking data outside of the system on which the module is deployed.

Thus, in accordance with various implementations, the module is unable to send at least some information to an external server, and the only input/output operation other than the exported functions used for simulation and validation would include a remote procedure call to a node primitive (e.g., a JSON-RPC primitive). Additionally, the module may be treated as a read-only proxy for RPC requests received by the wallet with which the module is integrated in order to allow the module to detect both malicious calls at or before the point of signature as well as malicious dApp probes of wallets based on known patterns associated with bad actors prior to any prompts for a user to sign a transaction. Thus, the module optimizes privacy and cybersecurity, both when deployed on the same device as the wallet it is integrated with and when deployed on an external system (e.g., the hosted module system 160, FIG. 1B).

In an embodiment, the security validation engine 210 is configured with a validation function that is designed to receive a RPC method (e.g., a JSON-RPC method) and to return a result indicating whether the received RPC method is malicious. In some implementations, the exported validation function may further express whether the RPC method is malicious with increased granularity, for example whether the method is benign, potentially malicious, or malicious. The exported validation function may also return a notification including an explanation of the results of its validation. The validation function may be defined with respect to one or more malicious call determination rules, which in turn may be utilized to determine whether a call (and, accordingly, the website that transmitted the call) is malicious or potentially malicious. Further, the malicious call determination rules may be defined with respect to known malicious or otherwise anomalous call behavioral data, which may be pushed as part of blobs updating the module (for example, periodically) to update such data and allow for detection of new indicators of malicious calls as those new indicators are identified.

In an embodiment, the simulation engine 220 is configured with a simulate transaction function and a raw simulate transaction function. The simulate transaction function is designed to obtain a transaction and to return a full simulation of the transferred assets indicated in the transaction as well as the potential exposure of the transaction. The raw simulate transaction function may obtain a transaction and return a full simulation for the transaction like the simulate transaction function, but for a raw byte string transaction. The simulation engine 220 may be further configured to simulate opcodes of calls, to parse changes, and to determine technical information related to user experience used for realistic simulations such as asset differentials, exposure differentials, events, and the like.

The RPC node provider 230 is configured to access one or more decentralized networks through remote procedure calls. More specifically, the RPC node provider 230 is configured to send remote procedure calls to RPC nodes of the decentralized network and to receive transaction data from those RPC nodes. An RPC node call is a call made using a lightweight communication protocol used for facilitating interactions among software applications. Remote procedure calls may be utilized to access data from a remote system, i.e., one of the RPC nodes of the decentralized network. Such RPC nodes are configured to respond to requests to a decentralized network such as a blockchain and to send transactions to requesting devices.

The RPC node provider 230, in combination with the security validation engine 210 and the simulation engine 220, may allow the module to simulate and validate transactions prior to signing. Moreover, in some embodiments, the RPC node provider 230 allows for using only RPC communication requests to a specified node provider and without requiring sending any other data to an external server. Accordingly, the RPC node provider 230 allows for preserving data privacy. That is, in such embodiments, the computer software including the functionality of the RPC node provider 230 may be implemented on a device (e.g., the device 120) and may perform simulations involving communications between the device and a decentralized network (e.g., between a device and one or more decentralized networks accessible over the Internet) without requiring that the device provide the intercepted wallet calls to an external system such as the module manager 140 or another third party device or system. In some implementations according to these embodiments, a node provider may be utilized as the only dependency, and therefore no data about the user is sent to a third party other than the node provider. This helps to ensure data privacy and increase cybersecurity, as the data does not need to be sent for testing on another system which would serve as another possible point of failure (i.e., if the external system is hacked, the user's data can be stolen even if the user's device and the decentralized network have not been penetrated).

Figure 3:
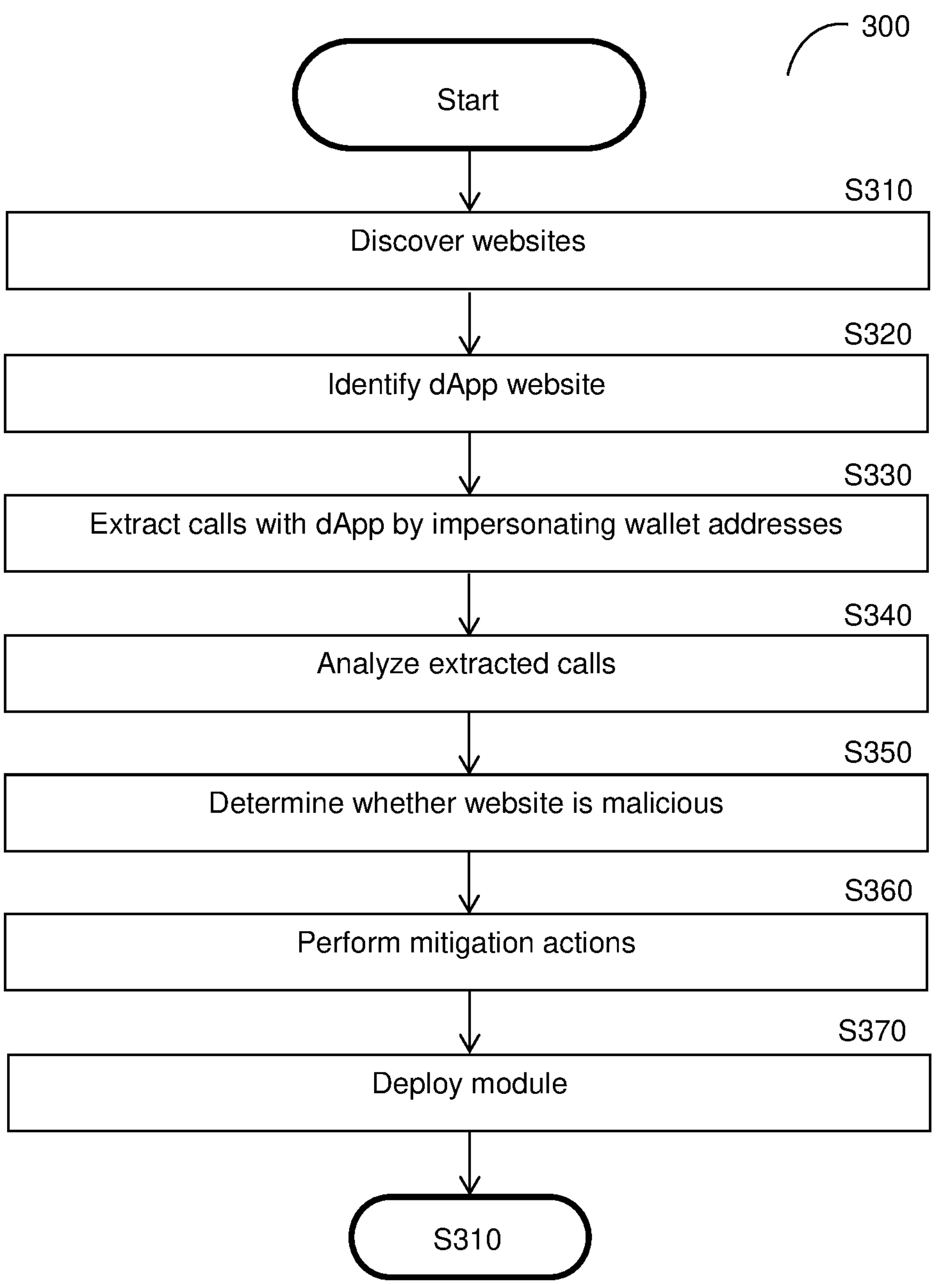
FIG. 3 is a flowchart illustrating a method for securing decentralized applications according to an embodiment.

FIG. 3 is a flowchart 300 illustrating a method for securing decentralized applications according to an embodiment. The method of FIG. 3 describes a testing process which can be utilized to identify malicious dApps. In an embodiment, the method is performed by the module manager 140, FIGS. 1A-B. In another embodiment, at least a portion of the method may be performed by a web scanner. For example, the discovery described with respect to S310, the scanning described with respect to any of S320 through S350, or both, may be performed by a scanner, and the results of the discovery and/or scanning may be sent to the module manager to be used for creating and causing deployment of modules.

At optional S310, websites may be discovered. The discovery process allows for identifying the existence of websites, for example, websites available over the Internet. In this regard, in various embodiments, the discovery process may be performed in order to perform an Internet-wide scan which is capable of discovering websites across the entire Internet. In an embodiment, data which may be indicative of the creation of new websites or which otherwise may indicate the existence of a website (e.g., website certificates, advertising data, etc.) is analyzed without requiring crawling through all websites in order to allow for such an Internet-wide scanning without requiring crawling through the entire Internet or another network hosting websites.

In this regard, it is noted that a list of known websites may not be available or may be based on missing information (i.e., such that the list itself is incomplete). Accordingly, using a discovery process that involves analyzing data related to the creation or existence of websites may allow for identifying more potentially malicious dApps than existing solutions without requiring crawling all potential websites, thereby further securing devices against cyber threats. Further, the discovery process may be utilized to proactively index the entire Internet in a manner where new dApps are discovered as they come online and can be scanned for potentially malicious behavior even before user data is compromised.

At S320, a website to be analyzed is identified as a decentralized application (dApp). The identified website may be, but is not limited to, a website among a list of known websites, a website discovered during the discovery process mentioned at S310, or a combination thereof. To this end, in some embodiments, S320 includes receiving a list of known websites, for example, a list of websites known to a user who wishes to have those websites analyzed for potential cybersecurity risks. In some embodiments, the website to be analyzed is a website found and determined to be a dApp during a discovery process.

In an embodiment, S320 further includes determining whether one or more websites are dApps or otherwise whether the websites are enabled for Web 3.0. In a further embodiment, such a determination may include performing a static, lightweight scan (for example, as a static scraping process) that can be performed efficiently (e.g., as compared to the full testing process described below) in order to eliminate some potentially irrelevant (i.e., non-dApp) websites before testing those websites. To this end, if a website scanned in this manner is not determined to be a dApp, the website may not be tested in subsequent steps.

In an embodiment, S320 may further include determining whether the website is a new website to be tested for potentially malicious behavior. More specifically, the discovery process may yield discovery of newly created websites such as, but not limited to, websites created since a last iteration of discovery, of scanning, or both. The websites identified as dApps to be tested may include all websites found during discovery, or may only include newly created websites found during discovery. In this regard, websites which have already been discovered and scanned may be excluded from the discovery process.

At S330, calls made by the website identified at S320 are extracted for analysis. In an embodiment, S330 including generating or causing generation of mock transactions that imitate transactions which would have been generated by a particular digital wallet (e.g., a wallet belonging to a particular user or entity). When those mock transactions are transmitted to a website, the responses to those mock transactions may include requests from the website, such as requests in the form of calls. Such requests may include, but are not limited to, network and remote procedure calls (e.g., JSON-RPC calls). Such calls may further include wallet calls made to a wallet deployed on a device communicating with the website.

The mock transactions used to trigger calls from the website may be created so as to impersonate one or more wallet address (e.g., wallet addresses owned or operated by one or more particular entities). Such impersonation may cause the website to determine that the mock transactions are being transmitted by valuable targets and, thus, to determine that calls should be sent to those targets. To this end, in an embodiment, one or more sample transactions from a particular wallet may be processed and utilized to generate a mock transaction that imitates the transactions which would be sent by the wallet. In response to the transmission of the mock transactions, potentially malicious dApps may respond with calls. As noted above, some of those calls may be utilized in an attempt to gain improper access to user data.

At S340, the extracted calls are analyzed. The extracted calls may include, but are not limited to, one or more requests from the website received responsive to the transaction. More specifically, the requests may include one or more wallet calls to the integrated wallet. As noted above, such wallet calls may be made by malicious sites in order to attempt to access data indicating information related to the user's identity or otherwise to obtain unauthorized access to user data via the wallet.

In this regard, it is noted that many malicious dApps behave differently when used by different wallets. Accordingly, creating mock transactions as discussed at S340 and analyzing the response from the website allows for effectively tricking potential dApps into determining that they are interacting with high value wallet addresses, which in turn triggers malicious dApps to generate malicious responses intended to obtain undesirable access to user data. Transaction-related data included in such responses, such as RPCs, may be analyzed and compared against a database of malicious call identifiers in order to determine whether a call and, consequently, the website that transmitted the call, is malicious.

At S350, it is determined whether the website is malicious based on the analysis of the extracted calls. In an embodiment, it is determined whether the calls included among the responses from the website include any anomalous behavior (e.g., based on requested activities, order of calls, timing of calls, etc.) and, if so, the website is determined to be malicious. In other words, in some embodiments, if a call transmitted by a website implemented as a dApp is flagged as malicious, the website (and, therefore, the entire dApp) may be flagged as malicious.

In an embodiment, S350 includes performing one or more checks for malicious dApps according to one or more predetermined malicious call detection rules. The malicious call detection rules may include rules for determining whether a call is malicious such that a dApp may be determined as malicious when it sends response data including one or more malicious calls. In some embodiments, the malicious call detection rules may define criteria related to anomalous call behavior such that calls demonstrating anomalous call behavior (either individually or in combination with other calls) may be identified as malicious calls.

More specifically, the malicious dApp detection rules may be defined with respect to historical data related to call behavior such as, but not limited to, activities or other information indicated in those calls, call order (i.e., an order in which calls are transmitted), call timing, combinations thereof, and the like. As a non-limiting example, historical on-chain activity data indicating on-chain activities that occurred on a blockchain during prior communications between the device and historical websites may be compared to on-chain activities indicated in the response from the website being tested in order to determine whether the behavior is unusual as compared to the historical data per the malicious call detection rules.

In this regard, it is noted that a blockchain is state-based, such that having an address of a website on a blockchain can allow for comparing a current state of the blockchain with respect to the website to previous states of the blockchain. More specifically, an address of a website being tested can be utilized in order to determine if the address was previously indexed in the pipeline of the blockchain. Accordingly, the address information can serve as a baseline from which anomalies (which may indicate malicious behavior) can be detected in order to determine whether a transaction is likely malicious.

In some embodiments, S350 further includes storing results of the malicious dApp determination in a database or otherwise building a security engine based on the results. Such a database may include data related to previous website determinations, and may be utilized in order to determine whether a call made by a website is coming from a malicious source. When a module is deployed to a device or system (for example, as described below with respect to S370), the data included in the module may include data on any previously scanned websites. In this regard, the modules deployed in this manner may act as a compressed version of a security engine with similar capabilities in terms of functionality and a subset of the data that can be updated to bring the module's data in line with that of the security engine (e.g., as more websites are scanned, results of those scans may be used to update the data of the security engine, and when new modules are deployed, the data of those new modules may include results of recent scans).

At optional S360, one or more mitigation actions may be performed with respect to the website. The mitigation actions may include, but are not limited to, blacklisting the website, blocking certain types of communications (e.g., wallet calls) between a device and the website, blocking all communications between the device and the website, severing a connection between the device and the website, generating a notification indicating that the website is malicious, combinations thereof, and the like.

At S370, a module is deployed based on results of one or more scans such as, but not limited to, the scan performed at S330 through S350. In an embodiment, the module is deployed in a system (e.g., the device 120 of FIG. 1A or the hosted module system 160 of FIG. 1B). To this end, the module deployed at S370 may be the module 127 of FIG. 1A or the module 167 of FIG. 1B. Further, the module may include the logical components depicted with respect to FIG. 2. In a further embodiment, the module has limited capabilities, i.e., the module is only configured to perform certain kinds of communications and is incapable of performing other kinds of communications.

In an embodiment, deploying the module at least includes creating module data for the module and transmitting the module to a destination (e.g., the device 120 or the hosted module server 160, FIGS. 1A-B). The module data may include, but is not limited to, data indicating whether dApps are malicious determined as described above with respect to S350, computer-readable instructions for executing one or more functions of the module, both, and the like. When the module is an update to an existing module, the created module data may include only differentials indicating changes from the existing module instead of sending the total amount of data of the entire module.

In yet a further embodiment, such limited communication capabilities may include using remote procedure calls (RPCs) as the only input/output (I/O) operation that the module is configured to send to websites such that the module cannot send any other information to an external server. Such limited capabilities can be utilized to prevent the module from sending any data related to the user outside of the device in which the module is deployed. This ensures privacy and prevents unauthorized exposure of data of the device while still allowing the module to communicate with potentially malicious websites in a manner that enables testing transactions via the module.

As noted above, the module that is deployed may be realized as a binary large object (blob) pushed to the device or system on which the module is to be deployed. Also noted above, such a blob may include differential data indicating differences from a prior version of a blob in order to reduce the amount of network resources needed to transmit the blob. To this end, S370 may include transmitting such a blob, for example via a content delivery network, where the blob is used to create a new module instance (e.g., a new module or an update to an existing module) at a destination (e.g., the device 120 or the hosted module server 160).

In an embodiment, the module may be integrated with a digital wallet of a device (e.g., the wallet 125 of the device 120, FIGS. 1A-B). The integration of the module is performed such that the module is configured to intercept calls to the wallet once integrated. To this end, in an embodiment, the wallet integration includes adapting the module to intercept calls to the wallet. As noted above, the module is configured to simulate and validate transactions. By intercepting calls to the wallet, the module may imitate transactions by the wallet while preventing the responses to those transactions from being transmitted to the wallet, thereby allowing for analyzing transactions for potentially malicious behavior without exposing the wallet to calls from potentially malicious websites prior to such analysis. The code for integrating the module with the wallet may be included in any blobs or other data transmitted to the device or system on which the module is to be deployed such that, when that code is executed, the module integrates with the wallet.

In an embodiment, execution continues with S310, where another website from a list of known websites or another website found during discovery is identified as the next website to be analyzed. It should be noted that FIG. 3 depicts an embodiment in which such testing is performed sequentially over iterations, but that the testing of any or all of the websites to determine whether they are malicious may be performed in parallel without departing from the scope of the disclosure.

Figure 4:
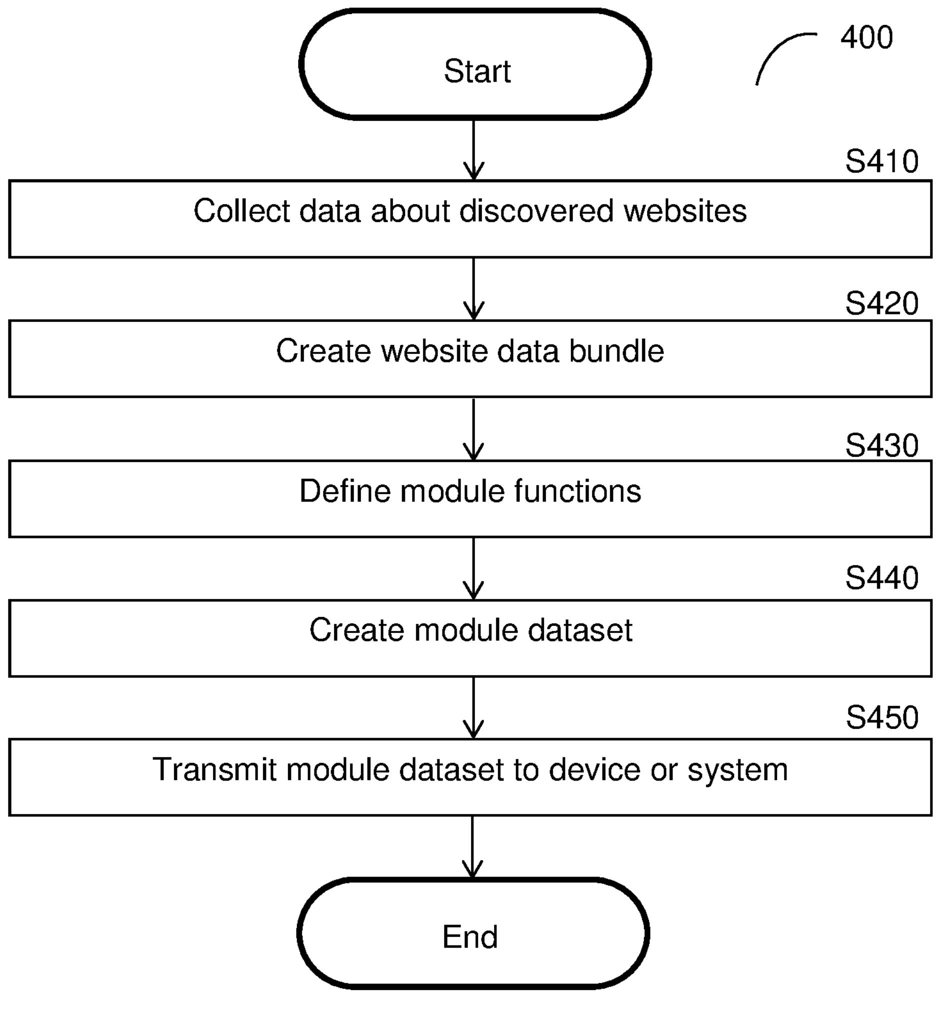
FIG. 4 is a flowchart illustrating a method for wallet integration according to an embodiment.

FIG. 4 is an example flowchart 400 illustrating a method for wallet integration according to an embodiment. The method may be performed in order to integrate the module 127 or the module 167 with the wallet 125, FIG. 1A. In an embodiment, the method is performed by the module manager 140, FIGS. 1A-B.

At S410, data about websites which have been discovered is collected. The data may include, but not limited to, data indicating websites included in requests to scan websites for potentially malicious behavior. Such requests may be provided explicitly, for example by customers of a service providing scanning of websites. The data may further include results of prior scans, for example, whether each website is benign, malicious, potentially malicious, and the like.

At S420, a website data bundle is created based on the data about the websites. The website data bundle includes information about the known websites and may include, but is not limited to, a list of known websites, a security identifier of each website (e.g., benign, potentially malicious, malicious, etc.), both, and the like.

At S430, module functions for the website are defined. The module functions are the functions to be executed by the module such as, for example, the simulation and validation functions as well as functions used for RPCs as described above with respect to FIG. 2. As noted above, a limited set of functions which do not allow for unauthorized leaking of data may be utilized for the module in order to ensure privacy and security of the user's data. To this end, in an embodiment, such functions only include simulation functions, validation functions, RPC functions, or a combination thereof.

At S440, a module dataset is created. The module dataset includes data to be pushed to a device or system on which the module is to be executed such that, when the functions of the module are executed using data of the module, the module is realized. Moreover, the module dataset may include any other computer-readable code related to deployment of the module. In an embodiment, the code related to the deployment of the module includes code for configuring the module to intercept wallet calls and to access transaction data from a wallet, thereby causing the wallet to become integrated with the wallet. Accordingly, pushing the module dataset to a device or system causes the integration of the module with a wallet and deployment of the module when the computer-readable code of the module dataset is executed on the device or system including or otherwise associated with the wallet.

In a further embodiment, the module dataset may be realized as a binary large object (blob). Such a blob is a collection of binary data. More specifically, the blob may be realized as binary data including the website data, the code of the module functions, any code for deployment and integration of the module, a combination thereof, and the like.

In an embodiment, when a module was previously pushed, the module dataset may include a limited subset of data indicating changes since a previous iteration. For example, such data may include a set of differentials. In such a case, the module dataset may only include differentials or other such changes as well as any other computer-readable code related to deployment of the module. This reduces the amount of data which needs to be transmitted in order to push updated modules to devices and systems. This significantly reduces the amount of networking resources needed for updating modules, particularly when the updated module must be pushed to multiple devices such as via a content delivery network (e.g., the CDN 150, FIGS. 1A-B).

At S450, the module dataset is transmitted to a device or system associated with a wallet with which the module is to be integrated, thereby causing the module to be deployed on that device or system. The module dataset may be transmitted directly or through one or more other systems and/or networks. In an embodiment, the module dataset may be broadcast to devices and/or systems via a content delivery network (e.g., the CDN 150, FIGS. 1A-B).

In an embodiment, the transmission of the module dataset is unidirectional, i.e., without requiring back-and-forth communications between the system performing the method of FIG. 4 and the device or system on which the module is to be deployed. As noted above, preserving privacy of user data may be highly desirable for various use cases. Using a unidirectional process for transmitting modules allows for minimizing transmission of data from the device or system, thereby reducing the exposure of potentially sensitive data (or data which may be useful for acquiring potentially sensitive data) on external systems outside of the device or system. Thus, such a unidirectional transmission improves cybersecurity of the device or system on which the module is deployed as compared to solutions involving more communication from that device or system.

As noted above, updated module datasets may be created based on new data and/or functions (e.g., data about new websites). To this end, the updated module datasets may be transmitted periodically or otherwise transmitted more than once. To this end, in such implementations, execution may continue with S410.

Figure 5:
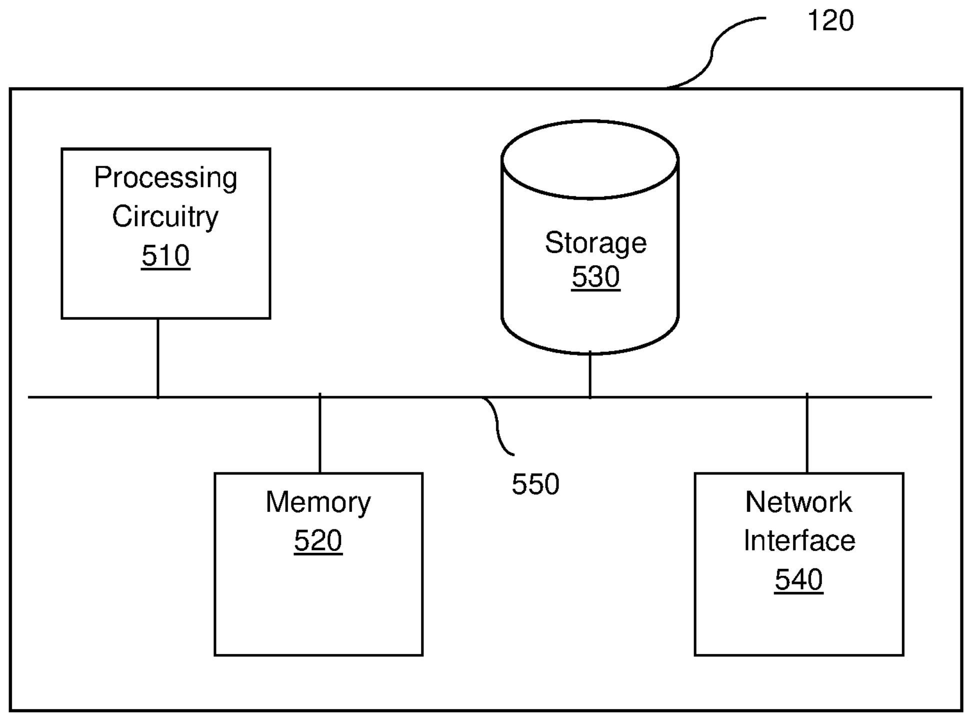
FIG. 5 is a schematic diagram of a hardware layer of a system which may be utilized in accordance with various disclosed embodiments.

FIG. 5 is an example schematic diagram of a hardware layer 500 which may be utilized in accordance with the disclosed embodiments. As a non-limiting example, the device 120 and any of its components (e.g., the digital wallet 125, the module 127, or both), the hosted module system 160 and any of its components (e.g., the module 167), or both, may be executed via the hardware layer 500.

The hardware layer 500 includes a processing circuitry 510 coupled to a memory 520, a storage 530, and a network interface 540. In an embodiment, the components of the hardware layer 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the hardware layer 500 to communicate with, for example, the decentralized network 135, the module manager 140, the CDN 150, and the like.

It should be understood that the embodiments described herein are not limited to the specific architecture illustrated in FIG. 5, and other architectures may be equally used without departing from the scope of the disclosed embodiments.

Figure 6:
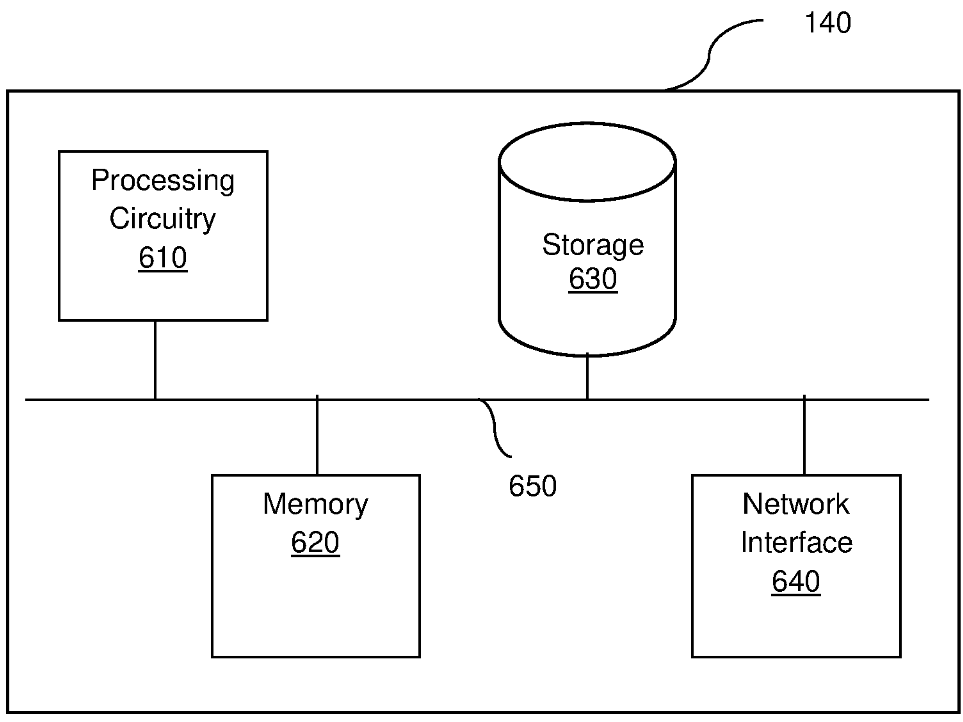
FIG. 6 is a schematic diagram of a module manager according to an embodiment.

FIG. 6 is an example schematic diagram of the module manager 140 according to an embodiment. The module manager 140 includes a processing circuitry 610 coupled to a memory 620, a storage 630, and a network interface 640. In an embodiment, the components of the module manager 140 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the module manager 140 to communicate with, for example, the device 120, the hosted module server 160, the CDNA 150, a combination thereof, and the like.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for digital wallet integration, comprising:

determining that a website is malicious; and deploying a module having data indicating the malicious website with respect to a digital wallet such that the module is configured to intercept remote procedure call (RPC) requests to the digital wallet, wherein the module is configured to generate transactions, wherein, responsive to at least a portion of the intercepted RPC requests, the module returns a simulation of transferred assets indicated in a transaction corresponding to the portion of the intercepted RPC requests, wherein the module is treated as a read-only proxy for the intercepted RPC requests, wherein the module imitates transactions by the digital wallet while preventing responses to those transactions from being transmitted to the digital wallet, and further wherein the simulation comprises a potential exposure associated with the transaction.

2. The method of claim 1, wherein the transactions generated by the module are a plurality of second transactions, further comprising:

generating a plurality of first transactions based on the digital wallet, wherein the plurality of first transactions comprises mock transactions that imitate transactions which would have been generated by the digital wallet and that are transmitted to a website, and further wherein a plurality of calls is extracted from a plurality of responses to the plurality of first transactions.

3. The method of claim 2, wherein the plurality of first transactions is generated based on a plurality of sample transactions for the digital wallet.

4. The method of claim 1, further comprising:

performing at least one mitigation action with respect to the website which is determined to be malicious.

5. The method of claim 1, wherein the module is configured to transmit only transactions and simulated responses.

6. The method of claim 1, wherein the module is a binary large object, wherein integrating the module further comprises:

pushing the binary large object to the digital wallet.

7. The method of claim 6, wherein the binary large object pushed to the digital wallet is a first version of the binary large object, further comprising:

pushing a second version of the binary large object to the digital wallet, wherein the second version of the binary large object includes differential data indicating differences as compared to the first version of the binary large object.

8. The method of claim 1, wherein deploying the module further comprises:

transmitting the module via unidirectional transmission.

9. The method of claim 1, wherein the deployed module includes:

a security validation engine, wherein the security validation engine is configured with at least one validation function designed to receive a remote procedure call (RPC) method and to return a result indicating whether the received RPC method is malicious;

a simulation engine, wherein the simulation engine is configured with a simulate transaction function; and a RPC node provider, wherein the RPC node provider is configured to send RPCs to a plurality of RPC nodes and to receive transaction data from the plurality of RPC nodes.

10. The method of claim 9, wherein the module is deployed on a first system, wherein the deployed module is configured to preserve privacy of at least an owner of the first system by sending data only including the RPCs to external second systems, wherein the external second systems are external to the first system.

11. A non-transitory computer readable medium having stored thereon instructions for causing a processing circuitry to execute a process, the process comprising:

determining that a website is malicious; and deploying a module having data indicating the malicious website with respect to a digital wallet such that the module is configured to intercept remote procedure call (RPC) requests to the digital wallet, wherein the module is configured to generate transactions, wherein, responsive to at least a portion of the intercepted RPC requests, the module returns a simulation of transferred assets indicated in a transaction corresponding to the portion of the intercepted RPC requests, wherein the module imitates transactions by the digital wallet while preventing responses to those transactions from being transmitted to the digital wallet, and further wherein the simulation comprises a potential exposure associated with the transaction.

12. A system for digital wallet integration, comprising:

a processing circuitry; and a memory, the memory containing instructions that, when executed by the processing circuitry, configure the system to:

determine that a website is malicious; and deploy a module having data indicating the malicious website with respect to a digital wallet such that the module is configured to intercept remote procedure call (RPC) requests to the digital wallet, wherein the module is configured to generate transactions, wherein, responsive to at least a portion of the intercepted RPC requests, the module returns a simulation of transferred assets indicated in a transaction corresponding to the portion of the intercepted RPC requests, wherein the module is treated as a read-only proxy for the intercepted RPC requests, wherein the module imitates transactions by the digital wallet while preventing responses to those transactions from being transmitted to the digital wallet, and further wherein the simulation comprises a potential exposure associated with the transaction.

13. The system of claim 12, wherein the transactions generated by the module are a plurality of second transactions, wherein the system is further configured to:

generate a plurality of first transactions based on the digital wallet, wherein the plurality of first transactions comprises mock transactions that imitate transactions which would have been generated by the digital wallet and that are transmitted to a website, and further wherein a plurality of calls is extracted from a plurality of responses to the plurality of first transactions.

14. The system of claim 13, wherein the plurality of first transactions is generated based on a plurality of sample transactions for the digital wallet.

15. The system of claim 12, wherein the system is further configured to:

perform at least one mitigation action with respect to the website which is determined to be malicious.

16. The system of claim 12, wherein the module is configured to transmit only transactions and simulated responses.

17. The system of claim 12, wherein the module is a binary large object, wherein the system is further configured to:

push the binary large object to the digital wallet.

18. The system of claim 17, wherein the binary large object pushed to the digital wallet is a first version of the binary large object, wherein the system is further configured to:

push a second version of the binary large object to the digital wallet, wherein the second version of the binary large object includes differential data indicating differences as compared to the first version of the binary large object.

19. The system of claim 12, wherein the system is further configured to:

transmit the module via unidirectional transmission.

20. The system of claim 12, wherein the deployed module includes:

a security validation engine, wherein the security validation engine is configured with at least one validation function designed to receive a remote procedure call (RPC) method and to return a result indicating whether the received RPC method is malicious;

a simulation engine, wherein the simulation engine is configured with a simulate transaction function; and a RPC node provider, wherein the RPC node provider is configured to send RPCs to a plurality of RPC nodes and to receive transaction data from the plurality of RPC nodes.

21. The system of claim 20, wherein the module is deployed on a first system, wherein the deployed module is configured to preserve privacy of at least an owner of the first system by sending data only including the RPCs to external second systems, wherein the external second systems are external to the first system.

* * * * *